May 28, 1974  E. I. VALYI  3,813,315

METHOD OF LAMINATING PLASTIC TO METAL

Original Filed Dec. 18, 1968

INVENTOR.

BY Emery I Valyi

C. H. Leek
ATTORNEY 3,813,315
Patented May 28, 1974

3,813,315
METHOD OF LAMINATING PLASTIC TO METAL
Emery I. Valyi, 5200 Sycamore Ave.,
Riverdale, N.Y. 10471
Continuation of application Ser. No. 784,568, Dec. 18, 1968, which is a continuation-in-part of application Ser. No. 712,144, Mar. 11, 1968, which in turn is a continuation-in-part of application Ser. No. 654,797, July 20, 1967, all now abandoned. This application Apr. 27, 1971, Ser. No. 137,974
Int. Cl. B32b *31/18;* C09j *5/02*
U.S. Cl. 156—254       10 Claims

ABSTRACT OF THE DISCLOSURE

A method of bonding a plastic layer onto a metal surface in which the metal surface is conditioned for efficient bonding, by first forming thereon a substrate by rolling the metal in contact with a polymer under sufficient pressure to reduce the thickness of the metal. The layer of plastic is bonded to the substrate which forms a link between the plastic layer and the surface of the metal.

---

This application is a continuation of application Ser. No. 784,568 issued Dec. 18, 1968, now abandoned which is a continuation-in-part of my co-pending application Ser. No. 712,144, filed Mar. 11, 1968, now abandoned which is a continuation-in-part of application Ser. No. 654,797, filed July 20, 1967, now abandoned.

This invention relates to a method of bonding a polymeric material to a metal surface and, more particularly, it relates to a method of bonding a layer of a plastic material to a metal strip or plate to form a permanently bonded composite structure.

An object is to produce a laminated structure composed of a metal element having a layer of plastic firmly bonded thereto. Another object is to provide a laminate, suitable for use as an electrical or mechanical structural element, composed of one or more metal strips having one or more layers of plastic firmly bonded to said strip or strips.

Another object is to overcome difficulties heretofore experienced in bonding a variety of organic polymers, including particularly polyolefins, to metal, with sufficient uniformity and strength to rely on the bond under exposure to prolonged, alternating, or severe stress and deformation.

Various other objects and advantages will be apparent as the nature of the invention is more fully disclosed.

In one embodiment of the invention, the surface of the metal is prepared for bonding to a plastic layer by first rolling a pair of plates or strips of the metal with a thin strip of plastic interposed therebetween, the total gauge reduction of the metal being substantial, such as for example in excess of 60%. The plastic is substantially protected from oxidation while in contact with the metal. Likewise, the plastic prevents the metal surface from coming into contact with the atmosphere and being oxidized. If such rolling is carried out at elevated temperature, it is followed by at least one cold rolling pass, with further reduction in thickness of the composite strip. The temperature of rolling depends upon the nature of the metal and the nature of the plastic. If the metal is cold during rolling, the plastic itself may be heated to a flowable condition in which it conforms readily to the entire surface of the metal.

By reason of these rolling steps, a substrate of polymer derived from the first interposed plastic is obtained, such substrate being often of no more than molecular thickness, and chemically bonded to the metal surfaces.

Favorable conditions for the formation of such a substrate may be illustrated in connection with aluminum and aluminum alloys. Aluminum is one of several metals upon which a natural oxide forms after short exposure to air, whereby the layer of oxide so formed remains very thin, because the process of oxidation is rapidly inhibited by the oxide layer.

The aluminum oxide which is thus always present on every air exposed aluminum surface has properties which are markedly different from that of the metal upon which the oxide formed, notably as to mechanical behavior, particularly in ductility. When deforming a sheet or plate of aluminum, such as by extensive rolling, the oxide which cannot fully participate in the deformation, fractures in a pattern of innumerable, minute fissures and cracks exposing unoxidized, metallic aluminum. The freshly exposed aluminum surface is, however, immediately coated with new oxide. Thus, the process of fracturing and reforing of the oxide layer is not noticed by simple observation and the surface, before and after a forming operation, appears to be almost the same.

If, however, the aluminum is completely protected from oxidation by a plastic film, as is the case in the composite rolling method here described, the oxide will not reform. Instead, due to the pressure of rolling, the plastic surface comes into intimate contact with the unoxidized aluminum. It is well known that the presence of the natural oxide film on aluminum effectively precludes adhesion of polyethylene, while a metallic aluminum surface adheres to polyethylene. Therefore, the rolling process which produces innumerable, sub-microscopic fissures in the aluminum oxide and exposes metallic aluminum, provides a corresponding number of points and areas in which adhesion of the polyethylene to the metal surface is obtained; the process of rolling promotes this occurrence.

In this manner, chemical bonding of the plastic to the aluminum proper is obtained. The extremely thin layer of plastic so bonded is then used as a substrate for bonding of additional amounts of plastic in subsequent steps to the substrate and, thereby, to the metal.

Accordingly, the present invention utilizes this polymeric substrate as a base onto which a layer of a plastic can be bonded, whose thickness is substantially greater than the thickness of the substrate. For this purpose, a layer of the plastic is disposed on a surface of the metal strip which has been prepared as above described and the contacting surface of the plastic is heated, as for example by heat transferred from the metal strip, to a temperature at which the plastic is capable of being pressure bonded to the substrate. Suitable pressure is then applied, by calendering or otherwise, to effect a firm, uniform and permanent bond, such as a fusion bond, between the prepared metal surface and the plastic layer.

For producing a compound, laminated structure, a pair of such metal strips may be placed on opposite sides of the plastic layer with their prepared surfaces in contact with the plastic and both of the strips may be pressure bonded to the plastic in the above manner, to produce a laminate composed of two metal elements with a plastic layer interposed therebetween and firmly bonded to the prepared surfaces of both strips.

The nature of the invention will be better understood from the following description, taken in connection with the accompanying drawings in which a specific embodiment has been set forth for purposes of illustration.

In the drawings:
FIG. 1 is an elevation of apparatus illustrating a step in the preparation of the substrate upon the metal by hot rolling, wherein two metal strips are hot rolled with a prepared strip of plastic therebetween;
FIG. 2 is a similar elevation, illustrating the final cold rolling step, to follow the operation shown in FIG. 1;

Figure 1:
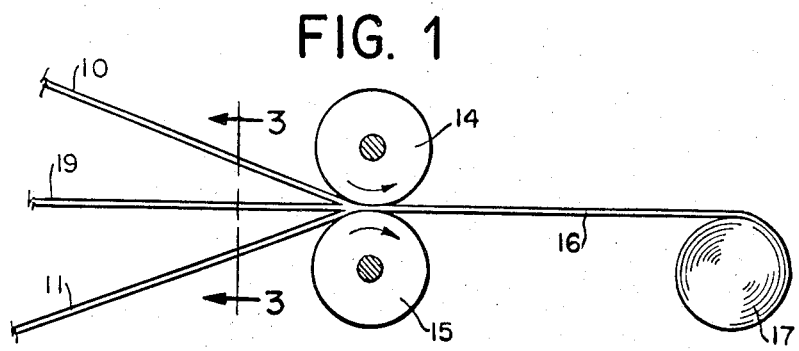

Referring to the drawings more in detail, a pair of metal strips 10 and 11 are shown as being fed to rolls 14 and 15 which constitute conventional rolls of a rolling mill.

Figure 3:
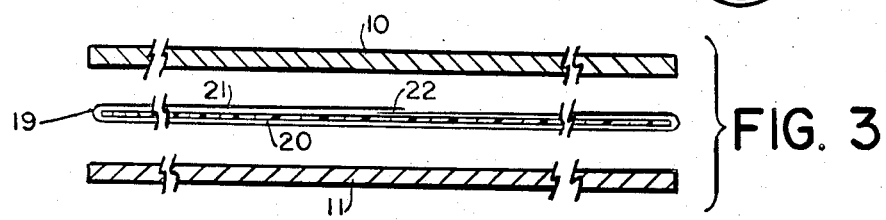
FIG. 3 is a section taken along the line 3—3 of FIG. 1, showing the relative position of the plastic and metal strips.
Figure 4:
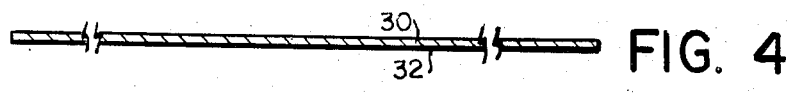
FIG. 4 is a transverse section taken on the line 4—4 of FIG. 2, illustrating the rolled product.

A strip 19 of plastic is fed to the rolls 14 and 15 between the metal strips 10 and 11. Usually the strip 19 is composed of bare plastic, but occassionally, if it is desired to use a plastic of extremely low viscosity, or to roll under conditions which would tend to accelerate the degradation of the plastic, the strip 19 may also be composed, as shown in FIG. 3, of a plastic layer 20 wrapped in a metal foil or sheet 21, whereby foil 21 serves to prevent access of air to the plastic during the rolling step and to retain it while in liquid or near liquid condition. The foil 21, if used, may be composed of the same metal as the metal strips 10 and 11, or of a different metal which, however, must be weldable to the strips. The edges 22 of foil 21 may be sealed or welded together to further preclude access of air and the escape of plastic from the protection of foil 21.

The strips 10, 11 and 19 may be taken from individual reels or they may be taken from a single reel onto which they have been coiled together for convenience in handling. In either case the coils of metal strips may be heated in a suitable furnace to the desired rolling temperature of the metal and the plastic strip may accordingly also be heated, either in the same furnace or later on, by contact with the hot metal strips, just before and during rolling.

If the metal strips are unheated prior to rolling, a plastic of low viscosity may be used, or the plastic may be heated prior to the rolling process to such a degree that, in the bite of the rolls, it is either liquid or at least as much deformate as the metal. For example, the metal may be cold rolled with a low molecular weight polyethylene which is extensively deformable at room temperature. The polyethylene, or other plastic may be dissolved in, or admixed to a carrier substance which does not interfere with the bonding process. It may also be heated just prior to the step of rolling to that temperature at which it becomes deformable; thus, the plastic may be introduced beween the strips of metal, as they enter the rolls by means of an extruder, or from a preheating device. Alternatively, one or both of the metal strips may be coated with the plastic prior to rolling, as by mechanical dipping, fluidized bed coating, or extrusion coating and the rolling step carried out at a temperature substantially below that normally used for hot-rolling, but near or above the temperature required to render the plastic deformable.

Rolling takes place under a pressure sufficient to effect substantial reduction of the metal of strips 10 and 11, for example such as to reduce the thickness of these strips by 60% or more, thus producing composite strip 16 with a corresponding increase in length. Under such conditions of rolling, the metal strips 10 and 11 extend sufficiently to expose newly formed unprotected metallic surface to the plastic substantially in the absence of air. The plastic layer 19 which is thus interposed between metal strips 10 and 11 in the bite of the rolls 14 and 15 prevents the two metal strips from welding together in the course of rolling, even if the rolling operation is carried out at a temperature which otherwise would result in roll-welding of the two. If a protective cover of foil is used surrounding the plastic, as is shown in FIG. 3, then the rolling operation must take place at a temperature which is sufficient to cause the surfaces of foil 21 which are in contact with metal strips 10 and 11, to weld to these strips. The plastic layer within foil 21 will however prevent the welding of the foil onto itself and thus the resulting composite strip emerging from the rolling operation will be the equivalent of the product above described as being made without the use of the protection of foil 21.

Figure 2:
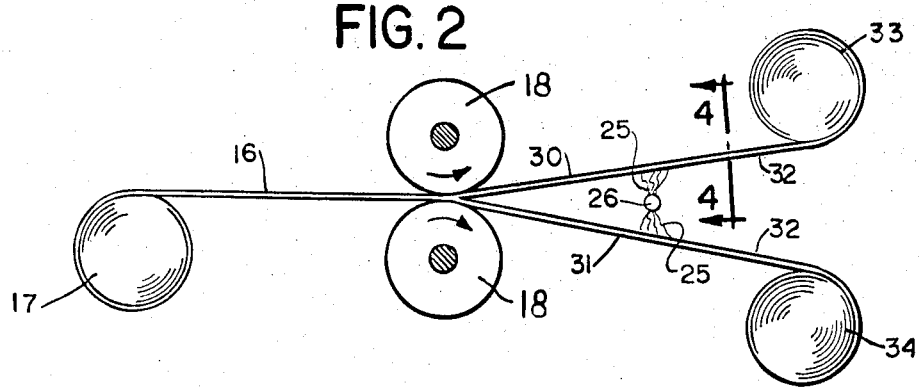

The composite rolled strip 16 may be reeled up onto reel 17 and may then be subjected to one or more rolling operations, some of which may be cold rolling passes, as indicated in FIG. 2, wherein the strip 16 is fed to rolls 18 under a pressure to effect a further reduction in thickness of the strip. After the final rolling pass, the metal strips 30 and 31 are separated and wound onto reels 33 and 34. During the rolling operation the surfaces of strips 10 and 11 which are exposed to the plastic will have contributed to extruding the plastic longitudinally to leave a film 32 which is extremely thin and may be of molecular thickness. That film is bonded to the contacting metal surfaces so that it cannot be stripped therefrom by mechanical means. The plastic strip 20 thus forms a substrate 32 upon the contacting surfaces of the strips 30 and 31 which presents the chemical characteristics of plastic. The plastic strip 19 is preferably of the same width as the metal strips 10 and 11, so that the plastic coats the entire contacting area to prevent welding of the metal strips during rolling. However, if the metal strips extend beyond the plastic, the edges of the metal strips will weld together, in which case the welded edges may be trimmed off after rolling, so as to allow the metal strips to separate. Such a trimming step is of course necessary whenever the plastic is encased in foil 21, as above indicated.

The rolled composite 16 is separated along its median line into strips 30 and 31, leaving a part of said substrate on the surface of each strip.

As an alternate to the above described procedure, one of the two strips 10 or 11 may be coated or otherwise protected from forming the plastic substrate. For example, if one of these two strips is coated with Teflon and the plastic itself is polyethylene, then the Teflon-coated strip will not bond to the polyethylene, while the uncoated strip will. In such a case, the coated, i.e. the second strip may be used over again in conjunction with the production of substrates on subsequent strips of metal. The second strip may also be arranged in the form of an endless belt instead of being coiled on reels. Such a strip may additionally be used as the means to carry the plastic into the bite of the rolls and into contact with the strip which is to be provided with a substrate; in other words, it may serve as a transfer device for the plastic, say from a source of preheated plastic to the rolling operation.

As is well known, the ability of certain plastics to bond, notably that of polyethylene, is enhanced if not indeed made possible by flame treatment or by corona discharge treatment. Accordingly, it is at times useful to apply such flame treatment or corona discharge treatment to the surface of plastic strip 20 before the plastic is introduced into the rolling operation illustrated in FIG. 1.

In addition, to condition the substrate itself for bonding to plastic, it may be subjected to flame treatment or corona discharge treatment before coiling of the rolled strip, or just before its use for subsequent bonding. If such treatment is to be carried out before coiling, as the strip emerges from the rolling operation shown in FIG. 2, the treatment may be effected by applying a flame 25 from a pipe 26 to the substrates 32 after they have been separated and before coiling the strips 30 and 31 on to the reels 33 and 34. If desired, a corona discharge may be applied at a suitable location. As indicated, this treatment is particularly useful in the case of polyolefins, such as polyethylene and renders the surface bondable to a plastic layer.

Figure 5:
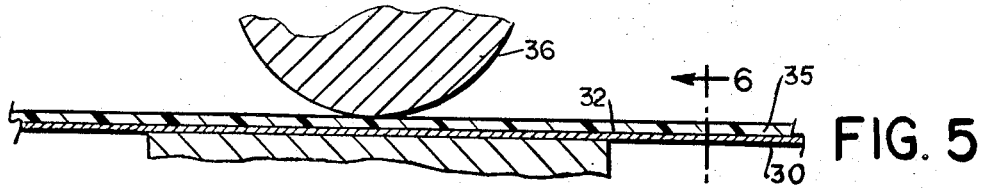
FIG. 5 is a side elevation illustrating the step of pressure bonding the plastic layer onto the prepared metal strip.
Figure 6:
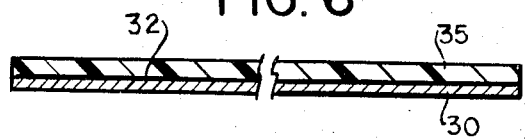
FIG. 6 is a transverse section taken on the line 6—6 of FIG. 5.

Either of the prepared strips 30 or 31 is now passed through a calendering station, as indicated in FIG. 5, where a relatively thick layer 35 of plastic is bonded to the prepared face of the strips which face of course carries the substrate 32 above described. The bonding surface or surfaces of layer 35 may be flame treated or treated by corona discharge prior to bonding. For bonding, the contacting surfaces of the layer 35 and of metal strip 30 or 31 may be heated to the softening temperature of the plastic and pressure exerted to effect a firm bond between the contacting surfaces. The layer 35 is shown as being passed under a calendering roll 36 which is suitably heated by means not shown. The layer 35 may comprise the same plastic as the one from which substrate 32 was obtained, or a plastic which is compatible therewith and may comprise a uniform plastic layer or a cellular layer, according to the characteristics desired. The layer 35 may also be made of materials other than plastic, such as paper, which materials in turn are coated with plastic, by means conventionally known, so that in the course of bonding according to the above described operations, the effective bonding steps take place between the substrate and the plastic coat of the layer 35. In place of a calender, as shown in FIG. 5, a press having heatable platens may be employed to effect the bonding of layer 35 to the strip 30 or 31.

Figure 7:
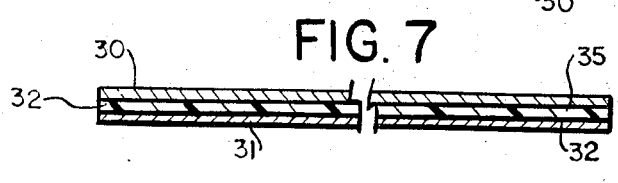
FIG. 7 is a section similar to FIG. 6, illustrating a laminated product composed of a pair of metal strips with the plastic layer therebetween and bonded thereto.

The product above described may be used as such, or a compound laminate suitable for structural purposes may be formed by placing two prepared strips 30 and 31 on opposite sides of the plastic layer 35 and suitable heat and pressure may be applied to fuse and bond the two strips to the intermediate plastic, to form a laminated product consisting of a pair of metal strips separated and bonded together by an intervening layer of plastic, or plastic coated filler material, as shown in FIG. 7. Here again, the operation of bonding the plastic layer 35 to metal strips 30 and 31 may be performed by other than continuous means; thus individual plates of prepared metal may be bonded to the layer 35 in a laminating press or other similar device well known in the art.

While the above product has been described as being composed of one layer of plastic or plastic coated filler material bonded to one or two layers of metal, it is evident that multiple laminates may also be produced wherein several layers of plastic or plastic coated filler material corresponding to the layer 35 are alternating with several layers of pretreated metal strips, each of which carry a substrate 32 on that side which is to be bonded to these layers 35.

The substrate 32 may be produced from several plastics, the choice of which depends upon the nature and composition of strips 10 and 11 and of layer 35. For example, polyethylene, polypropylene, polycarbonate, epoxy resin, phenol-formaldehyde, polyvinyl-chloride and other plastics may be so employed. The substrate 32 produced as above described is characterized by the fact that it may be made extremely thin, for example down to the order of 1 micron, and that it is so firmly bonded to the metal that it cannot be mechanically stripped therefrom. The metal upon which the substrate is formed may for example be aluminum, copper, iron, magnesium, zinc or an alloy of these. The surface of strips 10 and 11, as made of any of these metals, may be treated prior to the process of substrate formation, or it may be subjected to mechanical or chemical surface treatment or cladding prior to rolling.

While certain specific embodiments have been shown and described herein for purposes of illustration, it is to be understood that they are representative only and that the scope of the invention is to be limited only in accordance with the claims.

What is claimed is:

1. The method of bonding an organic plastic film onto an oxide coated metal substrate selected from the group consisting of aluminum, copper, iron, magnesium, zinc and alloys of these wherein said oxide is less extensible than the metal itself and wherein said plastic is incapable of substantial bonding to said oxide which comprises pressure rolling said plastic between a pair of said metal strips by reducing the metal strips to fracture the oxide thereon to form a plastic film which is bonded directly to the metal of both of said strips and separating said strips in a plane extending through said plastic to produce a pair of said metal strips each of which carries a bonded film of said plastic.

2. The method of claim 1 wherein said plastic is a polyolefin.

3. The method of claim 1 wherein the metal is aluminum.

4. The method of claim 1 wherein said plastic is heated prior to said pressure rolling.

5. The method of claim 1 wherein said metal is reduced at least 60%.

6. The method of claim 1 wherein said plastic is enclosed in a metal foil when subjected to pressure together with said metal and in which said foil and said plastic becomes bonded to said metal strips.

7. The method of claim 1 wherein the composite element composed of said metal strips with said plastic bonded therebetween is reduced by at least one hot rolling pass and by at least one cold rolling pass prior to the separation.

8. The method of claim 1 wherein said metal strips are the same metal.

9. The method of claim 1 wherein said plastic film is surface treated to improve the bonding characteristics thereof.

10. The method of claim 1 wherein said plastic film is selected from the group consisting of polyolefins, polycarbonates, epoxys, phenol-formaldehydes and polyvinylchloride.

References Cited

UNITED STATES PATENTS

| | | | |
|---|---|---|---|
| 3,174,889 | 3/1965 | Anderson et al. | 156—254 |
| 3,029,155 | 4/1962 | Maier et al. | 117—65.2 X |
| 2,351,498 | 6/1944 | Fowler | 156—247 |
| 3,589,975 | 6/1971 | Andrews et al. | 29—472.9 |
| 3,647,617 | 3/1972 | Rieke et al. | 156—324 |
| 3,293,895 | 12/1966 | Kohan et al. | 113—120 A |
| 3,454,445 | 7/1969 | Durst et al. | 156—306 |
| 3,397,045 | 8/1968 | Winter | 29—191 |
| 3,323,965 | 6/1967 | Hanle et al. | 161—216 |

FOREIGN PATENTS

| | | | |
|---|---|---|---|
| 245,963 | 10/1960 | Australia | 161—216 |

RALPH S. KENDALL, Primary Examiner

U.S. Cl. X.R.

156—309; 161—109, 406; 148—6.3